United States Patent [19]

Poulsen

[11] 4,110,149

[45] Aug. 29, 1978

[54] ROTATABLY DRIVEN MANDREL HAVING OUTER WALL FORMED BY CONTINUOUSLY CIRCULATING ENDLESS HELICAL BAND AND RADIALLY ADJUSTABLE SUPPORT MEMBERS FOR THE BAND

[75] Inventor: Peder Ulrik Poulsen, Fredensborg, Denmark

[73] Assignee: Owens-Corning Fiberglas Corporation, Toledo, Ohio

[21] Appl. No.: 813,579

[22] Filed: Jul. 7, 1977

[51] Int. Cl.² .......................................... B65H 81/00
[52] U.S. Cl. ................................... 156/429; 156/448; 242/72 R
[58] Field of Search ............... 156/446, 448, 449, 450, 156/425, 426, 428, 431, 173, 175; 279/2 R; 242/72, 72.1, 53, 110.2

[56] References Cited

U.S. PATENT DOCUMENTS

| | | | |
|---|---|---|---|
| 3,655,489 | 4/1972 | Poulsen | 156/429 |
| 3,679,521 | 7/1972 | Poulsen | 156/429 |
| 3,825,196 | 7/1974 | Yamazaki | 242/53 |
| 3,914,151 | 10/1975 | Poulsen | 156/429 |

*Primary Examiner*—David Klein
*Assistant Examiner*—Michael W. Ball
*Attorney, Agent, or Firm*—Ronald C. Hudgens; Patrick P. Pacella; Paul J. Rose

[57] ABSTRACT

The longitudinal support members for the endless helical band are circularly disposed about and adjustable radially of the mandrel axis. Each support member is mounted on a plurality of parallel arms of equal length spaced longitudinally of the mandrel axis. The outer end portions of the arms for each support member are pivotally connected thereto. At each of various locations along the mandrel axis, the inner end portions of the arms at that location for all of the support members are pivotally connected to a ring which is adjustable along the mandrel axis to effect radial adjustment of the support members, and a support ring, also adjustable along the mandrel axis, is provided to support the arms radially when the longitudinal support members are in an inner portion of their adjustment range.

10 Claims, 12 Drawing Figures

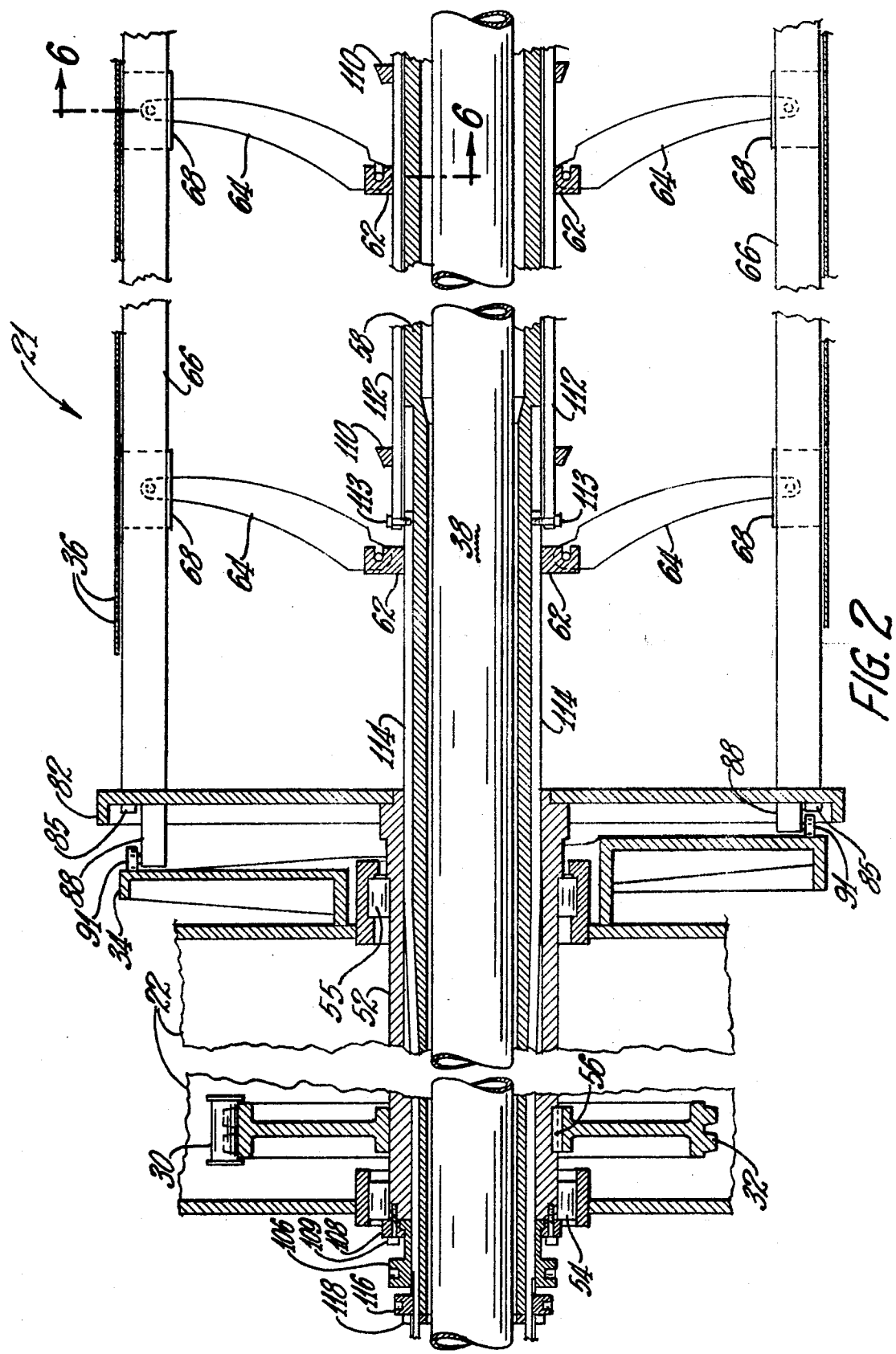

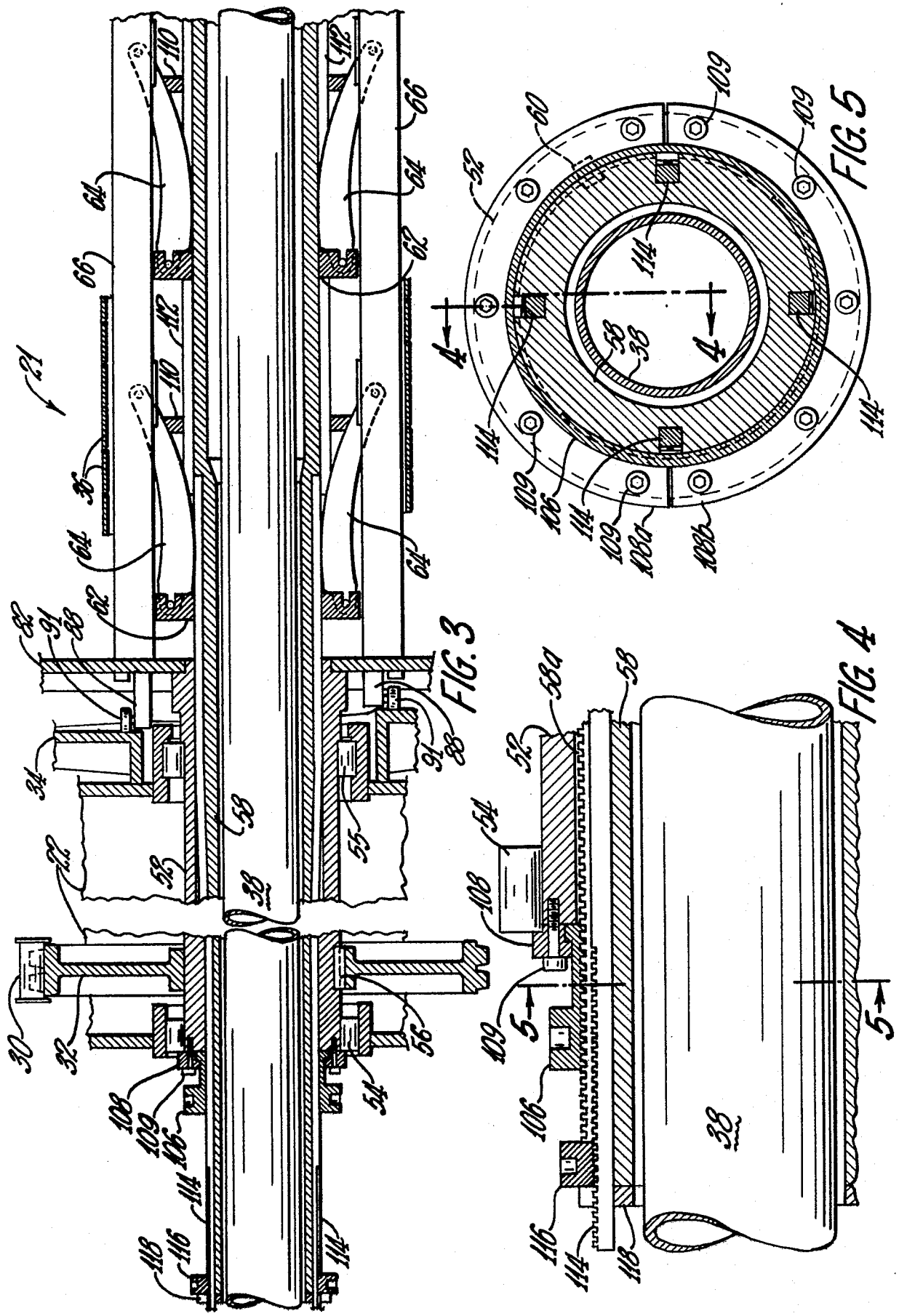

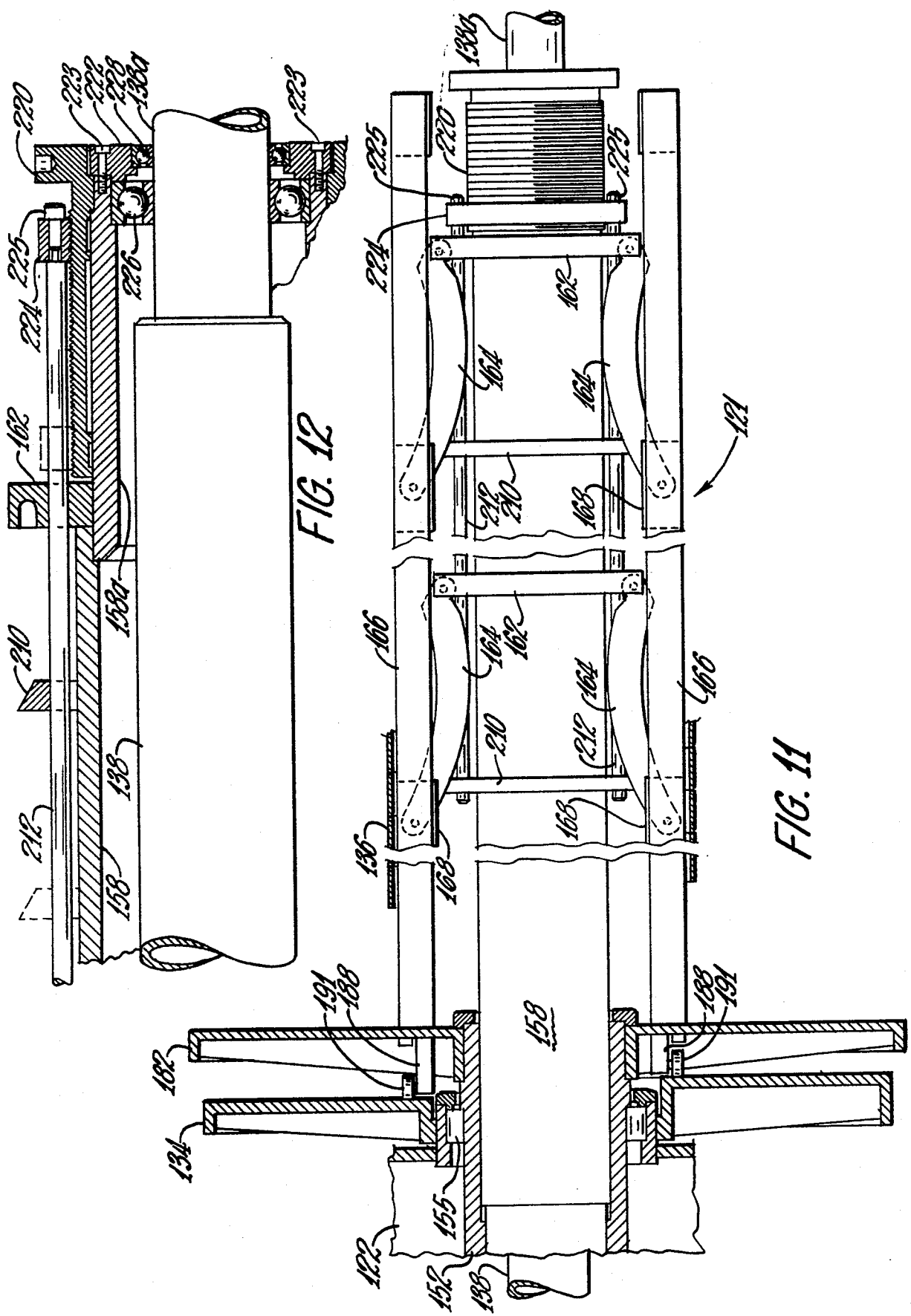

ROTATABLY DRIVEN MANDREL HAVING OUTER WALL FORMED BY CONTINUOUSLY CIRCULATING ENDLESS HELICAL BAND AND RADIALLY ADJUSTABLE SUPPORT MEMBERS FOR THE BAND

This invention relates generally to mandrels having an outer wall formed by a continuously circulating endless helical band to which pipe materials may be applied for continuous production of pipe, and more particularly to an improved construction and arrangement for adjusting the support members for the band radially of the rotational axis of the mandrel to change the diameter of the outer wall formed by the band.

Prior to my invention the radial adjustment of the support members for the band required disassembling the mandrel and substituting frame members of different length for the original frame members supporting the support members for the band. The mandrel had to be out of use for a considerable amount of time, a large amount of labor was required, and difficulty in accurately locating the substitute frame members was experienced. Such a prior mandrel is disclosed in my earlier U.S. Pat. No. 3,679,521, issued July 25, 1972.

In accordance with my invention, radial adjustment of the support members for the band no longer requires disassembling the mandrel framework. Further, stepless adjustment to any diameter within the working range is possible without investment in and storage of different sizes of frame members.

An object of the invention is to provide an improved construction and arrangement for radially adjusting the support members for an endless helical band forming the outer wall of a mandrel of a pipe making machine.

Another object is to provide adjusting means for the support members whereby subsequent to adjustment no checks for roundness and further corrections of shape are required.

A further object is to provide a mandrel having stepless or infinite adjustment to any diameter within its working range.

These and other objects will become apparent when the following specification is considered along with the accompanying drawings in which:

FIG. 2 is a fragmentary vertical longitudinal sectional view of the mandrel of FIG. 1 with support members for the outer wall in a radially extended position;

FIG. 3 is a view similar to FIG. 2, but with the support members in a radially contracted position;

FIG. 4 is an enlarged view of a left-hand end portion of FIG. 2 with certain parts in a different relative position and is also a cross-sectional view taken generally along the line 4—4 of FIG. 5;

FIG. 5 is a cross-sectional view taken generally along the line 5—5 of FIG. 4;

FIGS. 10 and 11 are views similar to FIGS. 2 and 3, but illustrating a different embodiment of the invention; and FIG. 12 is a fragmentary vertical longitudinal sectional view of the right-hand end portion of the mandrel of FIG. 10.

Figure 1:
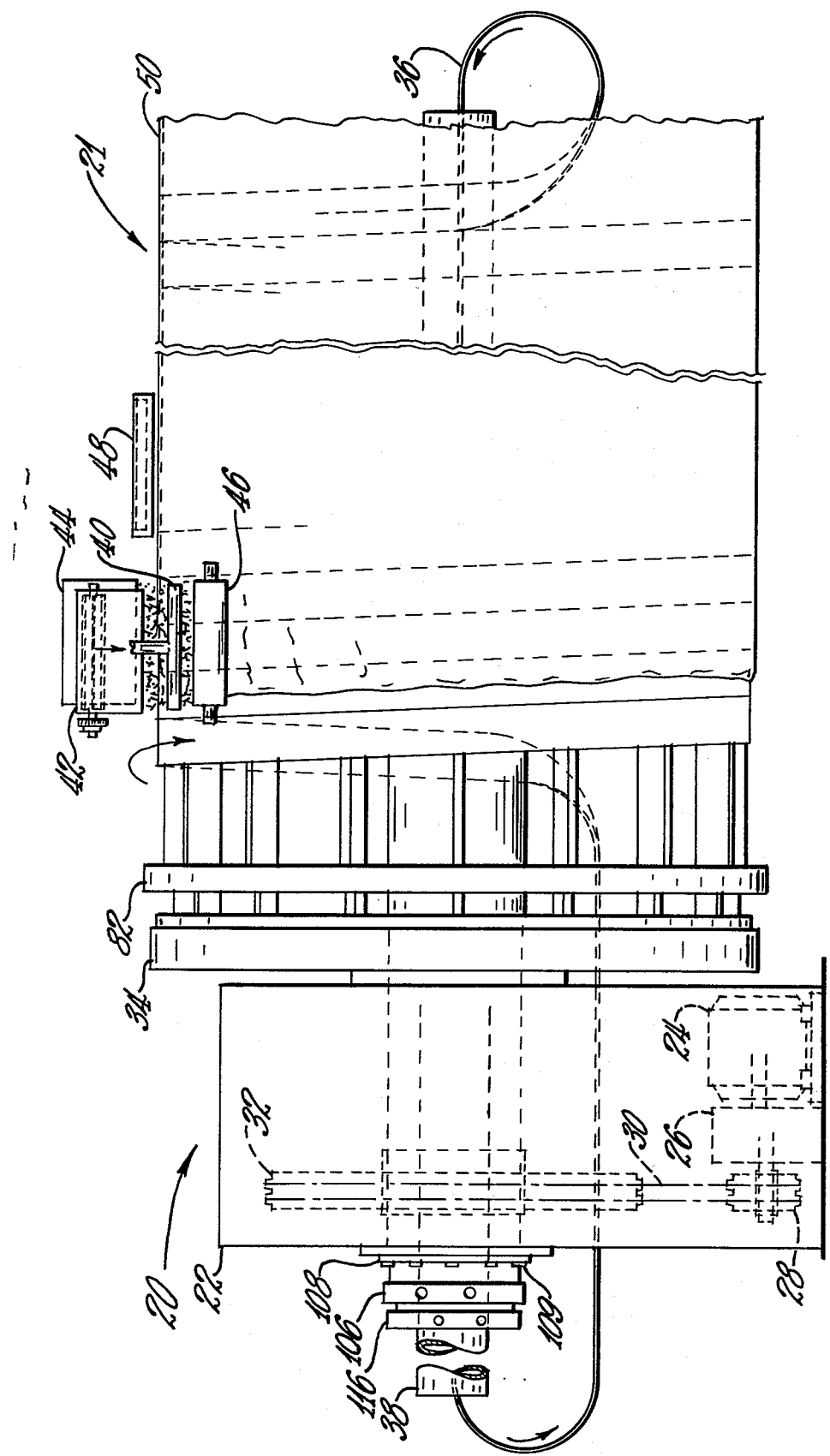
FIG. 1 is a somewhat schematic side elevational view of a pipe making machine having a rotatably driven mandrel constructed in accordance with the invention.

With respect to the drawings, FIG. 1 schematically illustrates a pipe making machine 20 having a mandrel 21 constructed in accordance with the invention. The machine 20 includes a housing 22 having a motor 24 mounted therein and operatively connected to a speed reducer 26 for rotating a driving sprocket 28 connected by an endless chain 30 to a driven sprocket 32 for driving the mandrel 21. A cam 34 only schematically illustrated in FIG. 1 but shown in more detail in FIG. 2 is secured to the housing 22 in any suitable manner.

An outer wall of the mandrel 21 is formed by an endless helically wound steel band 36 which continuously circulates when the mandrel is being rotatably driven, advancing a band width for each revolution of the mandrel toward a free end portion thereof and returning through a stationary central tube 38 for rewinding on the mandrel adjacent a mounted end portion thereof, appropriate guide rolls (not shown) being provided. The pitch of the helix equals the band width, whereby successive convolutions are in edge-to-edge relationship.

The machine 20 includes, by way of example, a resin applicator 40, a chopper 42 for applying chopped glass fibers, a hopper 44 for applying sand, a roller 46 for wetting out the glass fibers, and a heater 48 for accelerating the curing of the resin to produce a continuous length of pipe 50 which is cut into sections of appropriate length by a saw (not shown) spaced further in the direction of travel.

Figure 6:
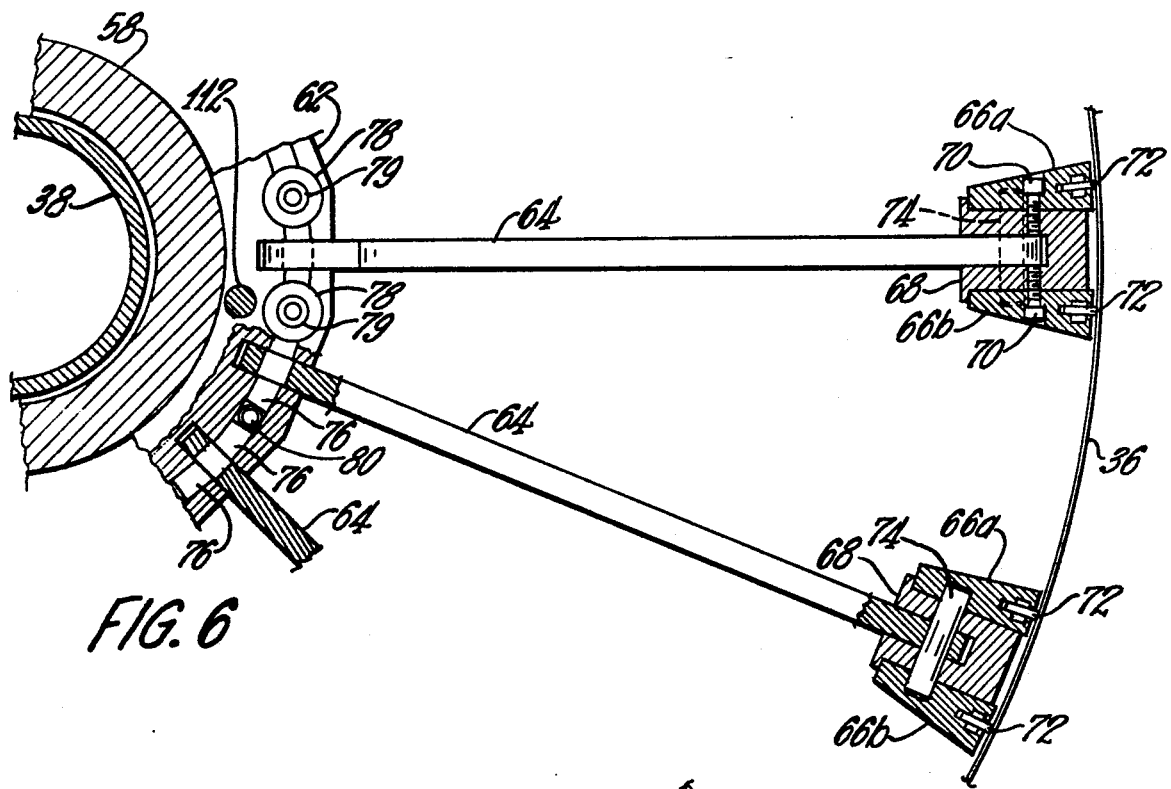
FIG. 6 is a fragmentary cross-sectional view taken generally along the line 6—6 of FIG. 2.

As shown in FIG. 2, a sleeve 52 is rotatably mounted in the housing 22 in a pair of bearing members 54 and 55. The sprocket 32 is keyed to the sleeve 52 by a key 56. A tubular shaft 58 forming the central structural support member of the mandrel 21 is mounted in the sleeve 52 and is preferably stepwise reduced in wall thickness on the inside from the mounted end toward the free end. The shaft 58 rotates with the sleeve 52, being keyed thereto within the housing 22 by a key 60 only shown in broken lines in FIG. 5, the keyway in the shaft 58 associated with the key 60 being elongated to permit the shaft 58 to be moved axially within the sleeve 52. Several mounting rings 62 are fixedly secured to the shaft 58 in spaced relationship therealong. Each ring 62 has inner end portions of a plurality of flat, elongated arms or radially extensible and contractable connecting members 64 pivotally connected thereto and distributed equally annularly therearound, with flat side surfaces parallel to and disposed equally on opposite sides from respective radial planes containing the axis of the ring. In the embodiment shown, each ring 62 has sixteen arms 64 pivotally connected thereto and centered 22½° apart. At each ring 62, the outer end portion of each arm 64 is pivotally connected to a respective one of a plurality of longitudinal support members 66 for the helically wound band 36. As shown in FIG. 6, each support member 66 includes a pair of beams 66a and 66b secured to a plurality of spaced slotted mounting blocks 68 respectively on opposite sides thereof by screws 70 such as shown in the upper block 68 shown in FIG. 6 and indicated also in the block 68 of FIG. 8. Each of the beams 66a and 66b has a longitudinal groove on a side thereof facing the band 36 and has a plurality of rollers 72 mounted in the groove and spaced longitudinally therealong. The rollers 72 may be constructed and mounted in any of the three manners shown in the aforesaid U.S. Pat. No. 3,679,521 or in an equivalent manner. The rollers 72 permit the band 36 to be advanced easily axially of the mandrel 21 without slippage circumferentially of the mandrel. Each arm 64 is pivotally connected at its outer end portion to a respective one of the mounting blocks 68 by a pin 74, as best shown in the lower block 68 of FIG. 6. Each ring 62 is radially slotted to receive inner end portions of the respective arms 64 and is provided with an annular groove facing the free end of the mandrel 21. Mounting pins 76, on which inner end portions of the arms 64 are respectively pivotally mounted, are disposed in the annular groove and held therein adjacent opposite ends by washers 78 and screws 79 threaded into holes 80.

Figure 8:
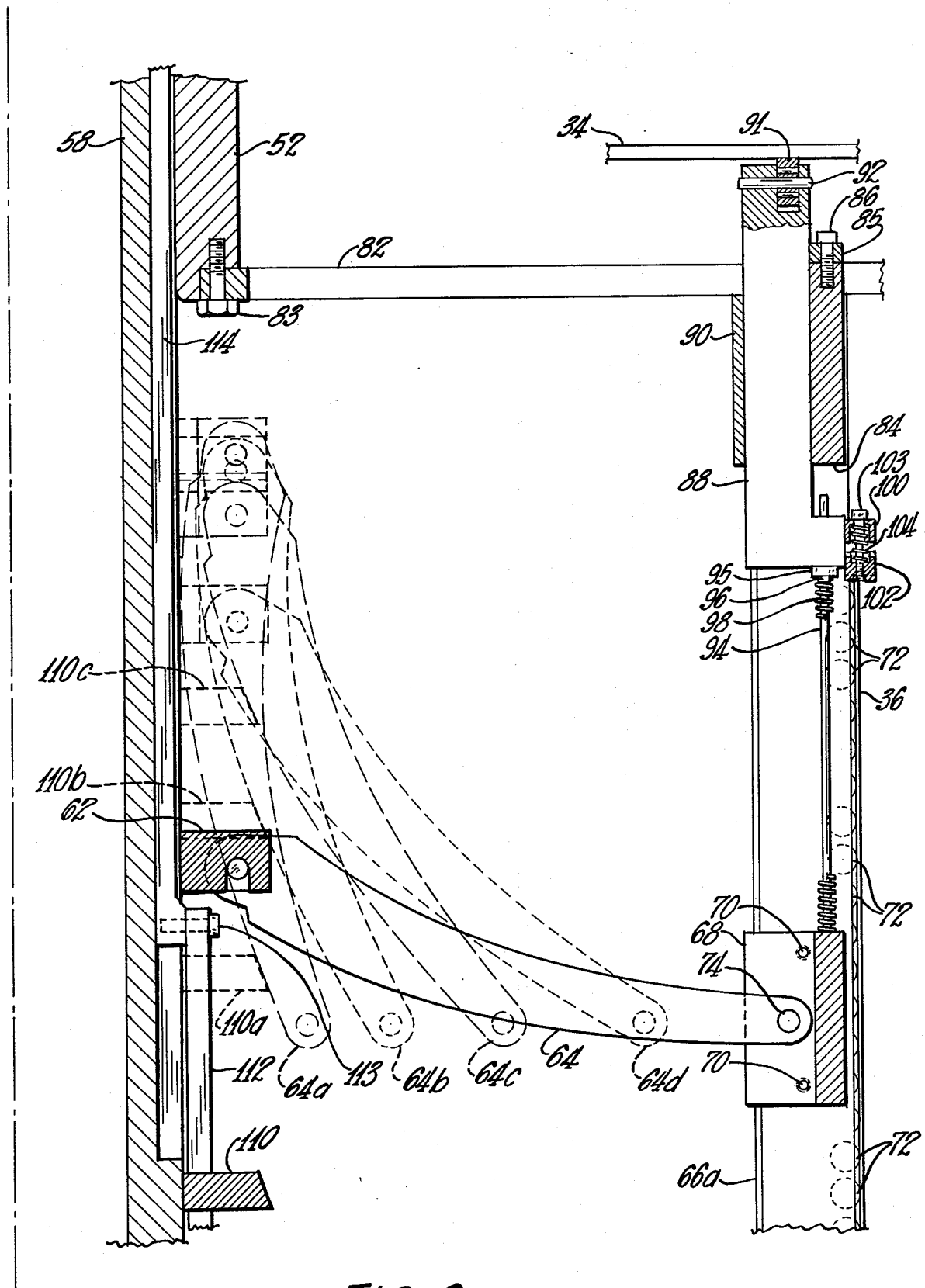
FIG. 8 is an enlarged fragmentary sectional view similar to the upper central portion of FIG. 2 but showing additional details.
Figure 9:
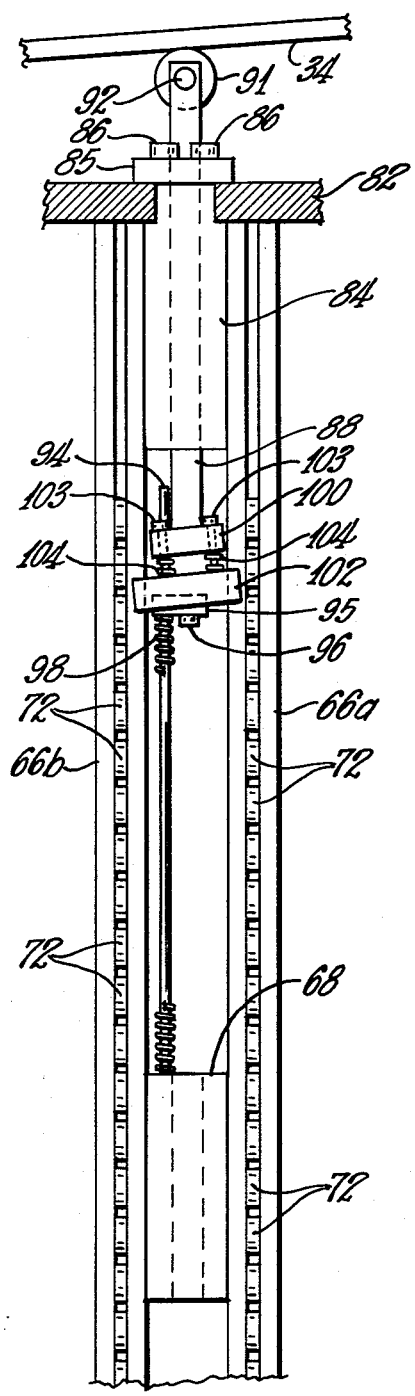
FIG. 9 is a fragmentary plan view taken from the right-hand side of FIG. 8.

A radially slotted flanged disk 82 best shown in FIGS. 2, 8, and 9 is secured to the sleeve 52 for rotation therewith, by bolts such as the bolt 83 of FIG. 8. Each pair of beams 66a and 66b is also secured respectively to opposite sides of a slotted guide block 84 having a narrowed end portion disposed within a respective one of the radial slots in the disk 82 and maintained therein by a retaining plate 85 disposed on the opposite side of the disk 82 and secured to the block 84 by a pair of screws 86. Each guide block 84 has a generally L-shaped cam follower 88 reciprocally mounted therein and retained therein by a retaining plate 90 secured thereto. Each cam follower 88 extends through a respective one of the slots in the disk 82 into operative engagement with the cam 34. In the embodiment shown in FIGS. 8 and 9, the cam follower 88 is slotted at the end adjacent the cam 34 to receive a roller 91 mounted on a pin 92. In the embodiment of FIGS. 2 and 3, the rollers 91 are mounted radially outwardly of the cam followers 88. Each cam follower 88 is biased toward the cam 34 in a suitable manner. As shown, a rod 94 has one end portion secured to the adjacent mounting block 68 and the other end portion reciprocally mounted in an offset guide member 95 secured to the cam follower 88 by a screw 96. A compression spring 98 mounted on the rod 94 bears against the guide member 95 to urge the cam follower 88 toward the cam 34. Each cam follower 88 is provided with means for forming the band 36 into a helical configuration on the mandrel 21, as successive cam followers are moved by the cam 34. Thus, each cam follower 88 has a block 100 fixedly secured thereto and a block 102 yieldably mounted thereon for engagement with the band 36. Two screws 103 are threaded into the block 102 and reciprocally mounted in the block 100. The blocks are countersunk to receive compression springs 104 mounted respectively on the screws 103.

Figure 7:
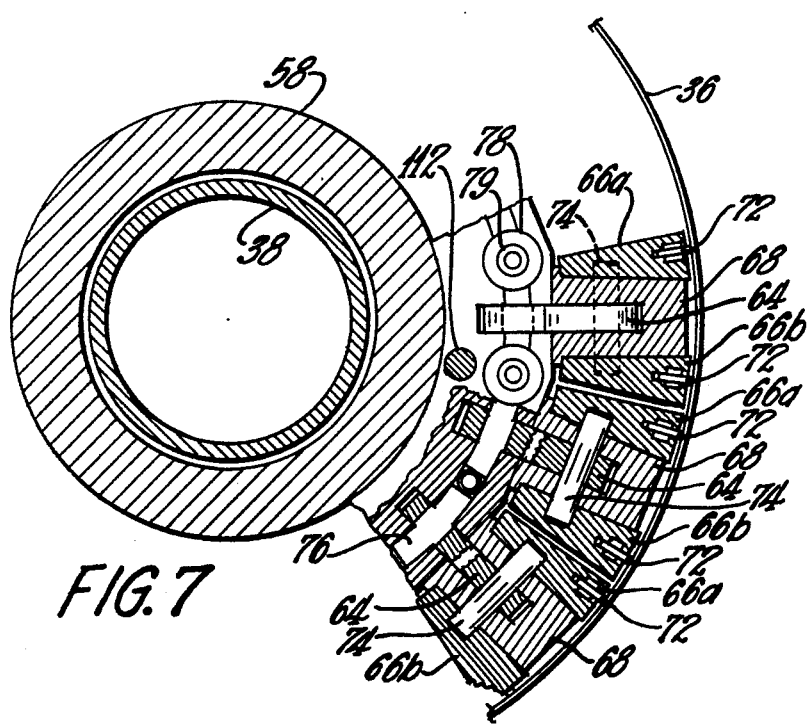
FIG. 7 is a view similar to FIG. 6 but with the support members in a radially contracted position as in FIG. 3.

In accordance with the invention, the tubular shaft 58 is axially adjustable within the sleeve 52 to radially adjust the longitudinal support members 66 for the band 36 any amount from a fully extended position of FIGS. 2 and 6 to a fully contracted position of FIGS. 3 and 7. A flanged nut 106 is axially fixed and rotatably secured to the sleeve 52 by a flanged collar 108 secured to the sleeve by a plurality of screws 109. The collar 108 may be split into two halves 108a and 108b as shown in FIG. 5. As best shown in FIG. 4, the nut 106 is provided with internal square threads which cooperate with external square threads 58a provided on the rear end portion of the tubular shaft 58. When the nut 106 is turned, the shaft 58 is axially shifted in the sleeve 52. The mounting rings 62 move with the shaft 58, but the longitudinal support members 66 are axially fixed with respect to the radially slotted disk 82. Therefore the arms 64 change position, their inner pivot pins 76 moving axially of the mandrel 21 and their outer pivot pins 74 moving radially of the mandrel. The longitudinal support members 66 are thus adjusted radially of the mandrel when the nut 106 is turned, the guide blocks 84 and cam followers 88 being free to move in their respective slots in the disk 82. The adjustment of the members 66 is carried out with the motor 24 shut off and the band 36 removed. The length of the endless band 36 is adjusted in accordance with the adjusted position of the members 66, by cutting out or adding sections, before the band is rewound on the support members and threaded back through the tube 38.

When the longitudinal support members 66 are positioned in an outer portion of their adjustment range, the arms 64 provide sufficient support to maintain the mandrel wall provided by the band 36 truly cylindrical. However, when the members 66 are positioned in an inner portion of their aadjustment range, the arms 64 need additional support. For this reason, several support rings 110 (FIGS. 2, 3, and 8) are reciprocably mounted on the tubular shaft 58 respectively adjacent the fixed mounting rings 62. The rings 110 are tied together for movement as a unit by four tie rods 112 fixedly secured thereto and spaced 90° apart. The tie rods 112 are reciprocably mounted in the rings 62 except for the one adjacent the disk 82. Between the two rings 62 closest to the disk 82, end portions of the tie rods 112 are secured by screws 13 respectively to end portions of four rectangular rods 114 reciprocably mounted in appropriate slots in the tubular shaft 58 as best shown in FIGS. 4 and 5. The end portions of the rods 114 opposite from the screws 113 are provided with square threads on their outer sides for cooperative engagement with a nut 116 rotatably mounted on a reduced end portion of the tubular shaft 58 and retained thereon by a retaining collar 118 secured to the shaft 58 in a suitable manner and having appropriate slots for receiving the rods 114. Turning of the nut 116 on the shaft 58 adjusts the support rings 110 axially of the shaft.

In FIG. 8, the full-line position of the arm 64 shown is the radially extended position. The radially contracted position is indicated by broken lines at 64a. Other intermediate positions are indicated by broken lines at 64b, 64c, and 64d. The support ring 110 is shown in full lines and also in three other positions indicated by broken lines at 110a, 110b, and 110c. The position 110a is the proper position for the ring 110 when the arm 64 is in the position 64a, the position 110b is the proper position for the ring 110 when the arm 64 is in the position 64b, and the position 110c is the proper position for the ring 110 when the arm 64 is in the position 64c. The arms 64 and the rings 110 are so shaped that the rings 110 fully support the arms 64 in these various positions. When the arm 64 is in the position 64d or further radially extended, no support from the ring 110 is required.

The stationary central tube 38 is supported at the free end of the mandrel 21 by a bearing (not shown) inside the free end of the tubular shaft 58. The other end portion of the tube 38 beyond the nut 116 is supported in any suitable manner.

Figure 10:
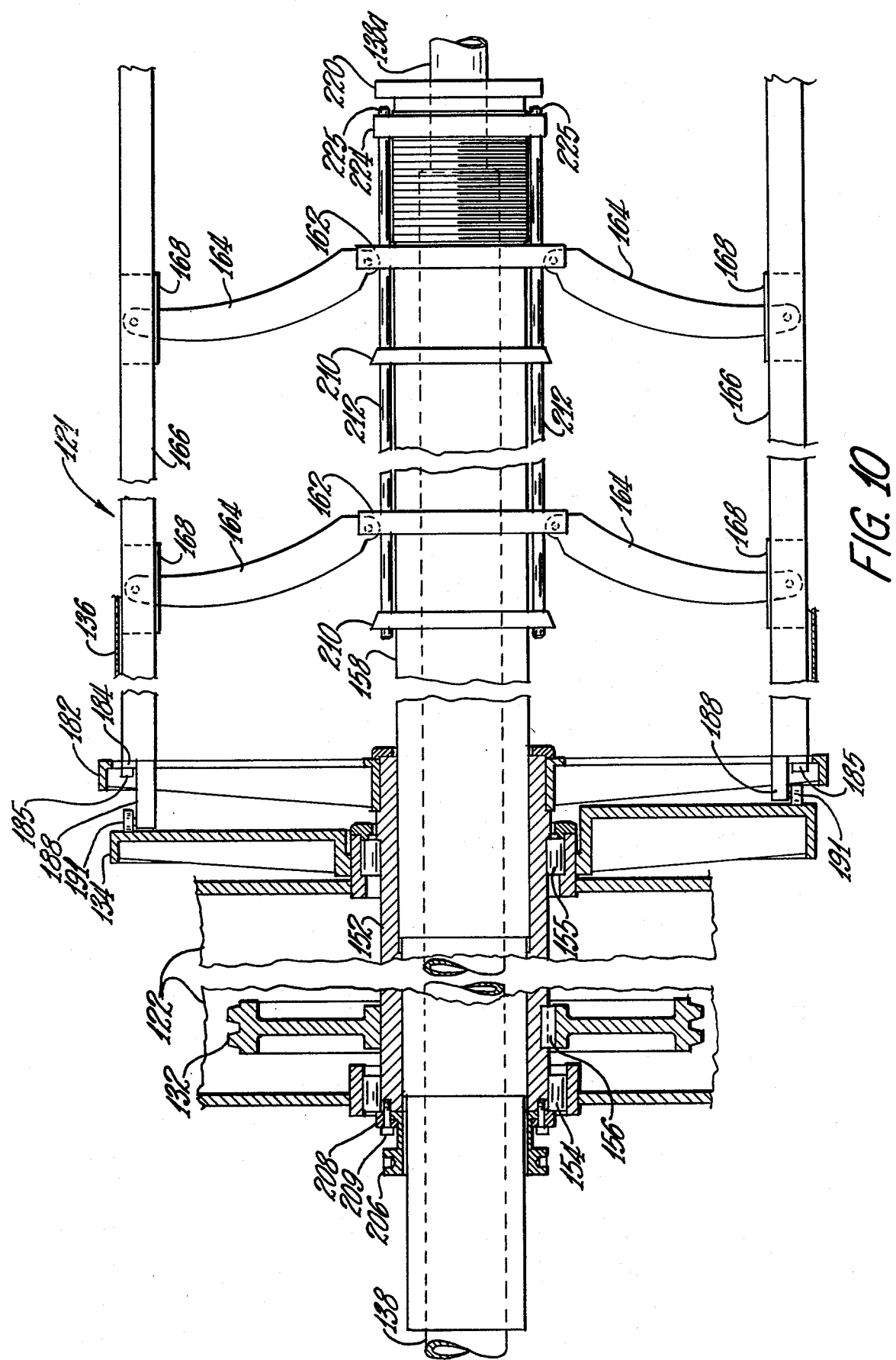

A preferred embodiment of the invention is shown in FIGS. 10 to 12. In the preferred embodiment, the arms 64 of the embodiment of FIGS. 1 to 9 are reversed, and the adjustment of the support rings 110 of the embodiment of FIGS. 1 to 9 is carried out from the free end of the mandrel, thus eliminating the rectangular rods 114 and the slots required therefor in the tubular shaft 58.

FIGS. 10 to 12 show a mandrel 121 supported in a housing 122 containing a driven sprocket 132 for rotatably driving the mandrel. A cam 134 is secured to the housing 122. An outer wall of the mandrel 121 is formed by an endless helically wound steel band 136 which returns through a stationary central tube 138. A sleeve 152 is rotatably mounted in the housing 122 in a pair of bearing members 154 and 155. The sprocket 132 is keyed to the sleeve 152 by a key 156. A tubular shaft 158 forming the central structural support member of the mandrel 121 is mounted in the sleeve 152 for rotation therewith, being keyed thereto by a key (not shown), but is movable axially within the sleeve 152. Several mounting rings 162 are fixedly secured to the shaft 158 in spaced relationship therealong. Each ring 162 has inner end portions of a plurality of flat, elongated arms 164 pivotally connected thereto and distributed equally annularly therearound, with flat side surfaces parallel to and disposed equally on opposite sides from respective radial planes containing the axis of the ring. At each ring 162, the outer end portion of each arm 164 is pivotally connected to a respective one of a plurality of longitudinal support members 166 for the helically wound band 136. The members 166 may be the same as the members 66 of the embodiment of FIGS. 1 to 9, with spaced mounting blocks 168 supporting pairs of rollered beams like the beams 66a and 66b.

A radially slotted flanged disk 182 is secured to the sleeve 152 for rotation therewith. Each slot of the disk 182 has a narrowed end portion of a guide block 184 retained therein for radial movement by a retaining plate 185. Each guide block 184 has a cam follower 188 reciprocally mounted therein for cooperative engagement with the cam 134 by means of a roller 191. Each cam follower 188 has means (not shown) for forming the band 136 into a helical configuration on the mandrel 121 as successive cam followers are moved by the cam 134, similar to the blocks 102 (FIGS. 8 and 9) of the embodiment of FIGS. 1 to 9.

In accordance with the invention, the tubular shaft 158 is axially adjustable within the sleeve 152 to radially adjust the longitudinal support members 166 for the band 136 any amount from a fully extended position of FIG. 10 to a fully contracted position of FIG. 11. A flanged nut 206 is axially fixed and rotatably secured to the sleeve 152 by a flanged collar 208 secured to the sleeve by a plurality of screws 209. The nut 206 has internal threads which engage external threads on the rear end portion of the shaft 158. When the nut 206 is turned, the shaft 158 is axially shifted in the sleeve 152. The mounting rings 162 move with the shaft 158, but the longitudinal support members 166 are axially fixed with respect to the radially slotted disk 182. Therefore the arms 164 change position, their inner end portions moving axially of the mandrel 121 and their outer end portions moving radially of the mandrel. The longitudinal support members 166 are thus adjusted radially of the mandrel when the nut 206 is turned, the guide blocks 184 and cam followers 188 being free to move in their respective slots in the disk 182.

The arms 164 are provided with additional support in an inner portion of their adjustment range. Several support rings 210 are reciprocably mounted on the tubular shaft 158 respectively adjacent the fixed mounting rings 162. The rings 210 are tied together for movement as a unit by a pair of tie rods 212 fixedly secured thereto and spaced 180° apart. The tie rods 212 are reciprocably mounted in the rings 162. Adjacent the free end of the mandrel 121, the tubular shaft 158 is provided with a radially reduced extension 158a (FIG. 12). One of the mounting rings 162 is mounted on the extension 158a and is thickened radially inwardly compared to the others to fit the extension. An externally threaded tubular screw 220 is rotatably mounted on the extension 158a and is retained axially with respect thereto by a retaining collar 222 secured to the extension 158a by a plurality of screws 223. A nut 224 is mounted on the screw 220 for axial movement therealong, rotational movement being prevented by the tie rods 212 each of which is secured to the nut by a screw 225. The collar 222 also retains a bearing 226 in the extension 158a and carries a second bearing 228. Both of the bearings 226 and 228 support an extension 138a of the stationary central tube 138, the other end of which is supported in a suitable manner beyond the nut 206. When the 206 is adjusted to retract the tubular shaft 158 toward its mounted end portion, the arms 164 are moved toward a radially extended position as shown in FIG. 10, wherein they are not aided by the support rings 210. When it is desired to move the arms 164 toward a radially contracted position as shown in FIG. 11, the tubular screw 220 is first adjusted to move the support rings 210 toward the mounted end portion of the tubular shaft. The nut 206 is then adjusted to project the tubular shaft 158 toward its free end portion until the arms 164 come to rest on the support rings 210.

Various modifications may be made in the structure shown and described without departing from the spirit and scope of the invention.

I claim:

1. A rotatably driveable mandrel for continuous production of pipe, the mandrel comprising a horizontally extending tubular shaft forming a central structural support member of the mandrel, means rotatably mounting an end portion of the tubular shaft, means for rotatably driving the tubular shaft, an outer mandrel wall spaced from and surrounding a free end portion of the tubular shaft, the outer wall being formed of an endless helical band which continuously circulates as the mandrel is rotatably driven, the band being wound helically toward the free end portion of the tubular shaft with a pitch corresponding to the band width whereby the convolutions are disposed in edge-to-edge relationship and being returned through the tubular shaft from the free end portion toward the mounted end portion thereof and back to the point where the winding starts, a plurality of elongated support members for the helical windings of the band, the band support members being circularly disposed and spaced equally apart about the tubular shaft, each band support member being supported by a plurality of parallel pivotable arms of equal length spaced from each other axially of the tubular shaft and having outer end portions pivotally connected to the band support member and inner end portions pivotally connected to the tubular shaft, means for preventing movement of the band support members axially of the tubular shaft while accommodating movement thereof radially of the tubular shaft, and shaft adjusting means for moving the tubular shaft axially in its mounting means to move the band support members radially.

2. A mandrel as claimed in claim 1 wherein each band support member comprises a pair of beams secured respectively to opposite sides of a plurality of mounting blocks spaced longitudinally of the beams.

3. A mandrel as claimed in claim 2 wherein each beam has a plurality of rollers mounted therein for engagement by the band, the rollers being spaced longitudinally of the beam for rotation about axes perpendicular to the beam.

4. A mandrel as claimed in claim 1 wherein the shaft adjusting means is a nut rotatably mounted on the mounting means and in threaded engagement with the tubular shaft.

5. A mandrel as claimed in claim 1 including a stationary central tube in the tubular shaft for receiving the return pass of the helical band.

6. A mandrel as claimed in claim 1 wherein the band support members are moved toward the tubular shaft by movement of the tubular shaft toward its mounted end portion.

7. A mandrel as claimed in claim 1 wherein the band support members are moved toward the tubular shaft by movement of the tubular shaft toward its free end portion.

8. A rotatably driveable mandrel for continuous production of pipe, the mandrel comprising a horizontally extending tubular shaft forming a central structural support member of the mandrel, means rotatably mounting an end portion of the tubular shaft, means for rotatably driving the tubular shaft, an outer mandrel wall spaced from and surrounding a free end portion of the tubular shaft, the outer wall being formed of an endless helical band which continuously circulates as the mandrel is rotatably driven, the band being wound helically toward the free end portion of the tubular shaft with a pitch corresponding to the band width whereby the convolutions are disposed in edge-to-edge relationship and being returned through the tubular shaft from the free end portion toward the mounted end portion thereof and back to the point where the winding starts, a plurality of elongated support members for the helical windings of the band, the band support members being circularly disposed and spaced equally apart about the tubular shaft, each band support member being supported by a plurality of parallel pivotable arms of equal length spaced from each other axially of the tubular shaft and having outer end portions pivotally connected to the band support member and inner end portions pivotally connected to the tubular shaft, means for preventing movement of the band support members axially of the tubular shaft while accommodating movement thereof radially of the tubular shaft, shaft adjusting means for moving the tubular shaft axially in its mounting means to move the band support members radially, a plurality of support rings for the pivotable arms, the support rings encircling the tubular shaft and being spaced from each other axially of the tubular shaft and further being movable axially of the tubular shaft and tied together for movement as a unit relatively to the tubular shaft, and support ring adjusting means for moving the support rings into various positions for supporting the pivotable arms in various adjusted positions thereof.

9. A mandrel as claimed in claim 8 wherein the support ring adjusting means includes rotatable threaded means disposed adjacent the mounted end portion of the tubular shaft and operatively connected to the support rings.

10. A mandrel as claimed in claim 8 wherein the support ring adjusting means includes rotatable threaded means disposed adjacent the free end portion of the tubular shaft and operatively connected to the support rings.

* * * * *